SIGNAL INTENSITY RESPONSIVE GASEOUS DISCHARGE DEVICE GATE

Original Filed Feb. 20, 1945

INVENTOR
WALTER LYONS.
BY H. G. Grover
ATTORNEY

April 11, 1950 W. LYONS 2,503,958

SIGNAL INTENSITY RESPONSIVE GASEOUS DISCHARGE DEVICE GATE

Original Filed Feb. 20, 1945 2 Sheets-Sheet 2

INVENTOR
WALTER LYONS.
BY H. S. Grover
ATTORNEY

Patented Apr. 11, 1950 2,503,958

UNITED STATES PATENT OFFICE 2,503,958

SIGNAL INTENSITY RESPONSIVE GASEOUS DISCHARGE DEVICE GATE

Walter Lyons, Bayside, N. Y., assignor to Radio Corporation of America, a corporation of Delaware Original application February 20, 1945, Serial No. 578,877. Divided and this application February 14, 1947, Serial No. 728,673

2 Claims. (Cl. 250—27)

This application, which is a division of my U. S. application, Serial #578,877, filed February 20, 1945, relates to relaying apparatus in general, such as might be used in diversity systems in general, and in particular to diversity receivers of the type wherein means is provided at the various receivers to use only the best received signal and render the receivers responding to weaker signals ineffective to contribute to the output.

The main general object of my invention is improved control of an alternating current channel repeater or gate.

The present invention has been described as in channel selecting connections in a diversity receiver system, but has other uses obvious to those skilled in the art.

In the embodiment discussed three receivers are arranged in triple diversity. The receiver outputs are to be so used that recording or similar means is controlled by the strongest signal, which also renders ineffective the channels wherein weaker signals appear.

Figure 1:
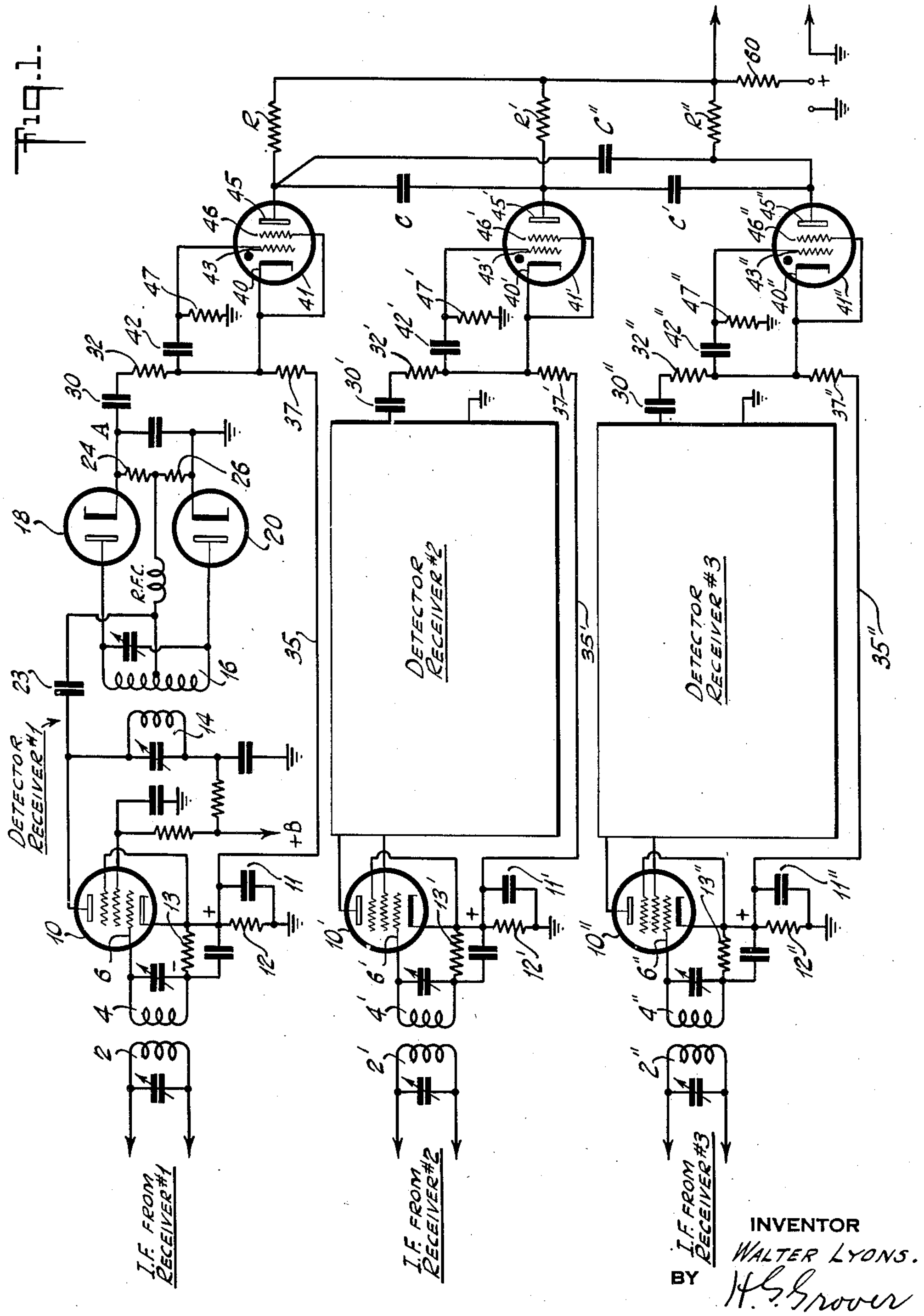
Figures 2, 3:
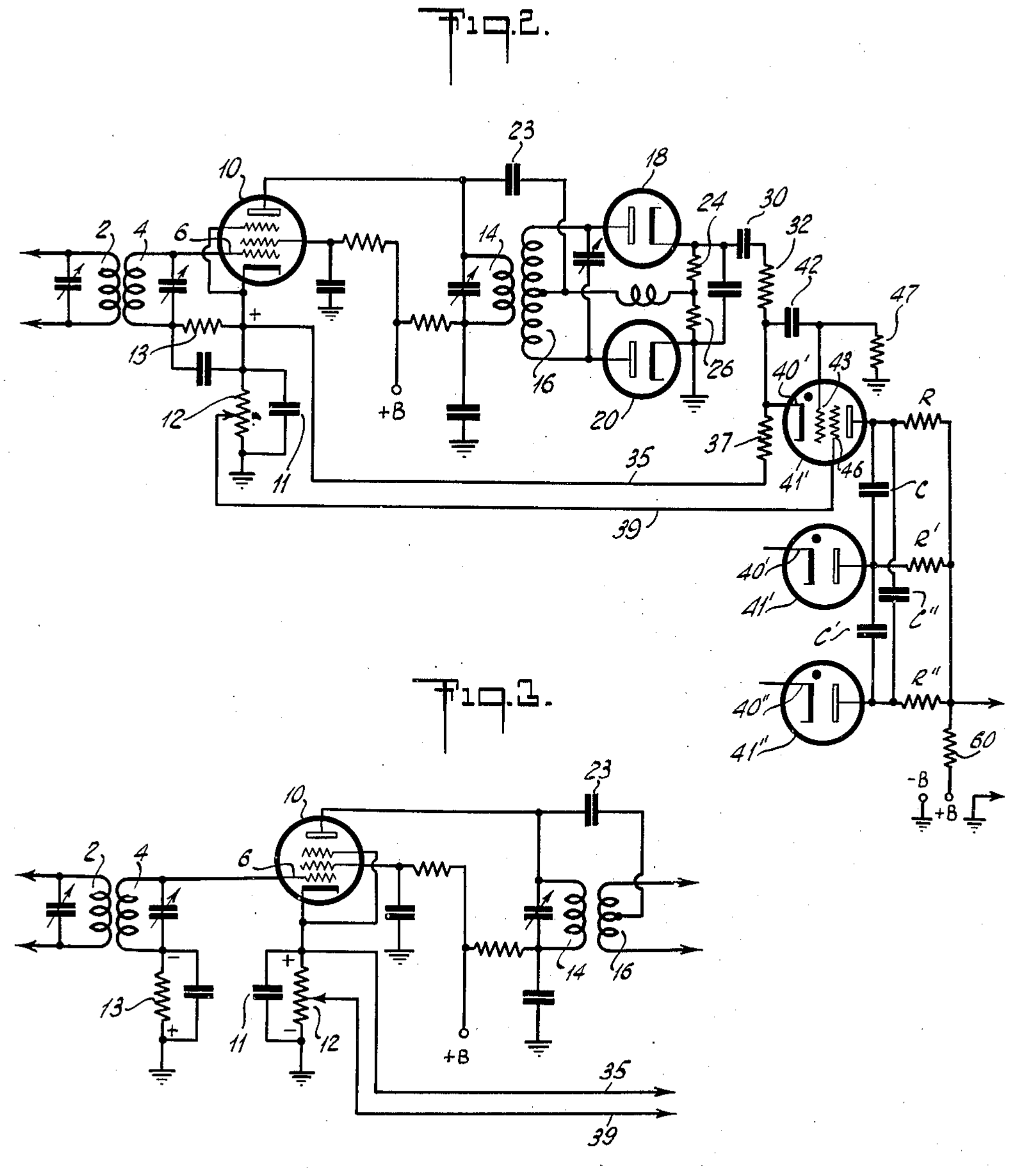

In describing my invention in detail, reference will be made to the attached drawings wherein Fig. 1 illustrates the essential details of the intermediate frequency circuit connections of three wave receivers in a diversity system arranged in accordance with my invention, Fig. 2 is a modification of the arrangement of Fig. 1; while Fig. 3 is a modification of the arrangements of Figs. 1 and 2.

Intermediate frequency output from three antenna radio frequency amplifiers, etc., #1, #2 and #3, are supplied to the primary winding of intermediate frequency transformers 4, 4' and 4''. To further simplify the disclosure, the novel features of the illustrated portion of receiver #1 will be described. The description thereof applies equally well to the other receivers and similar reference numerals primed and double primed are used to designate the elements in channels #2 and #3 respectively.

The intermediate frequency energy is supplied to the input grid 6 of a limiter tube stage 10, which in turn is used to drive a discriminator and detector operating at the intermediate frequency. The input circuits 2 and 4 are tuned to the frequency of the intermediate frequency energy supplied to the circuit 2. The cathode of tube 10 is connected to ground by a cathode biasing resistor 12 shunted by a radio frequency bypass condenser 11, while the grid direct current circuit includes a resistor 13 shunted by a radio frequency bypassing condenser. On the application of signals a potential is developed in resistor 12 and in resistor 13 depending upon the signal strength. The negative potential developed in resistor 13 due to grid rectification is proportional to the signal strength, while for reasons pointed out in detail hereinafter, the positive potential developed in resistor 12 is inversely proportional to the signal strength.

The anode of the tube 10 is connected to a tuned circuit 14. The inductance of the tuned circuit 14 is coupled to the inductance of a tuned circuit 16 the terminals of which are connected to diodes 18 and 20. A point on the inductance of the tuned circuit 16 is connected by a radio frequency choke RFC to a point between resistances 24 and 26, between the cathodes of the diodes 18 and 20. The condenser 23 connects the high potential end of tuned circuit 14 to a point on the inductance 16 to thereby couple tuned circuit 14 in parallel to the anodes of diodes 18 and 20 which are also inductively coupled to tuned circuit 14 by tuned circuit 16 in pushpull relation. This discriminator operates in a well known manner as disclosed in Seeley Patent #2,121,103 to produce across resistances 24 and 26 at the point A a potential which varies above or below about zero potential an amount depending upon whether the frequency of the intermediate frequency energy applied to the circuits 14 and 16 is above or below the resonant frequency of these circuits. In the embodiment described, this energy is keyed from a first frequency on one side of the resonant frequency to a second frequency on the other side of the resonant frequency as described above.

The output of this discriminator appearing at the point A may be treated as alternating current and this point is connected by an alternating current circuit including condenser 30 and resistance 32 to the cathode 40 of a tetrode Thyraton valve 41. This is the valve or repeater to be controlled in accordance with my invention.

The alternating current signal appearing at the point A is prevented from firing the tube 41 by inclusion of a condenser 42 between the control grid 43 of this tube and the cathode 40. If the tube 41 is extinguished changes in the cathode potential due to the alternating current fed thereto by resistance 32 are also applied by condenser 42 to the control grid 43 so that the potential difference between the grid 43 and the cathode 40 does not materially change and the tube remains extinguished.

The cathode 40 of tube 41 is also connected to the cathode resistor 12 of the limiter stage 10 in order to receive the potentials developed therein to strike or ignite the tube 41 when the potentials on the cathode grid and anode of tube 41 are properly related. This connection 35 includes a resistor 37 which serves to prevent shorting the signal potential applied to grid 43 to ground by the capacitor 11 across resistance 12. Ignition of the tube 41 causes the detected signal from the discriminator appearing at point A to be supplied to the load circuit 60. The anode 45 of tube 41 is connected by resistance R and load impedance 60 to the positive terminal of a direct current source the negative terminal of which is grounded. The anodes 45, 45′ and 45″ are each coupled to the other by condensers C, C′ and C″. The control grid 43 is connected to ground by resistance 47 to have essentially ground potential in order that the effective bias potential between grid 43 and the cathode 40 of tube 41 is such that the grid is always negative with respect to the cathode.

The firing potential in each channel, i. e., the positive potential applied from resistance 12 to the cathode 40 by lead 35 and resistance 37 is inversely proportional to the received carrier strength due to the negative potential built up across resistor 13 in the grid circuit by grid circuit rectification. The higher the signal applied in the circuit 2 the higher the negative potential on the grid 6. This serves to more or less decrease the plate current in tube 10 as the signal amplitude increases, thus reducing current through resistor 12 and the positive potential developed across cathode resistor 12 and appearing at the cathode of tube 41. The potential across resistor 12 is applied to the cathode 40 of the tube 41 as a striking or igniting potential. As the signal strength increases the potential at 12 falls as described above and the potential at 40 falls. This in turn results in effectively making the potential of the grid 43 of gas tube 41 less negative and the tube strikes and passes signal to the load 60. Obviously, the channel receiving the strongest signal and applying the same to the tube 10 or 10′ or 10″ will strike its Thyratron gas tube first. The characteristic of these gas tubes is such that the grid potential no longer controls discharge once the tube is fired.

Similar connections are made in the additional channels #2 and #3 including tubes 41′ and 41″. The anodes 45, 45′ and 45″ of the tubes 41, 41′ and 41″ are mutually inter-connected by the capacitors C, C′ and C″, the charging currents of which serve to blow out the discharges in the two tubes having higher control potentials impressed on their respective cathodes. Assume, for example, that the tube 41 has been struck and conducts current through the resistor R. The potential at the anode 45 end of this resistance R drops because of the heavy current flowing in R and this permits the condenser C and the condenser C″ to discharge the high direct current potential at anodes 45″ and 45′ so that current flows through resistances R′ and R″ and condensers C″ and C′ through the impedance of tube 45 to lower the potentials on the anodes 45′ and 45″ to a point at which these tubes in the channels then receiving weaker signals are maintained extinguished or if ignited are blown out.

A portion of the total plate loads of the three Thyratrons 41, 41′ and 41″ is a common impedance 60 across which the signal due to the strongest channel is available for output.

It may be desirable to connect grid 46, i. e., the shield grid to some point on resistance 12 by a lead 39 as shown in Fig. 2 instead of to the cathode of the tube 41 as shown in Fig. 1, to adjust the threshold value or firing point of tubes 41, 41′ and 41″. This connection also provides a convenient means to relatively adjust the potential of the three shield grids 46, 46′ and 46″ in order that tubes 41, 41′ and 41″ may be given similar operating characteristics if they do not inherently have such characteristics.

Making the grid 46 more negative reduces the value of the effective negative potential on the grid 43 at which firing of the Thyratron takes place. Increasing the negative potential on the shield grid 46 will require the control grid to be more positive, i. e., less negative before firing takes place, and this in turn requires a stronger signal on cathode 40 for firing the tube. When considering this operation keep in mind that the potential across resistance 12 is inversely proportional to the received signal strength.

The embodiment of Fig. 3 includes features of Figs. 1 and 2. The grid leak resistor 13 is connected to ground instead of to the cathode of tube 10 as in Figs. 1 and 2. The operation of this part of this alternative embodiment to accomplish limiting in tube 10 and supply the control potential by lead 35 to the cathode 40 of the gate tube 41 is as in Figs. 1 and 2. Lead 39 serves the same purpose as lead 39 in Fig. 2.

In the description given above it is said that the alternating currents to be passed by the tubes 41, 41′ and 41″ are applied to the tube cathodes 40, 40′ and 40″ respectively, and that to prevent this alternating current from firing the tubes alternating currents of like phase are fed to the control grids 43, 43′ and 43″ respectively. Once a tube is fired its internal impedance is very low and it is correct to say that the alternating current voltages fed to the cathodes are passed by the tubes. Moreover, it is seen that the firing potentials applied to the cathodes fire the tubes because the cathodes become less positive as the carrier intensity grows, which is the same as making the grids less negative. The potentials developed across the resistances 12, 12′ and 12″ may be said to control the direct current potentials on the grids 43, 43′ and 43″. If desired the connections to the tubes 10, 10′ and 10″ may be arranged to provide negative potentials which decrease with an increase in carrier strength, and use these potentials to control the potentials on the grids 43, 43′ and 43″.

As brought out in the specification the carrier of greatest intensity provides the best signal when demodulated and this signal is selected and passed along by using as the gating potentials the direct current developed in resistances 12, 12′ and 12″. These potentials are about inversely proportional to their carrier intensities, and it may also be said that these potentials are likewise about inversely proportional to the average amplitude of the alternating currents representing the signals and derived by demodulating the received carriers when the same are modulated in amplitude at the transmitter and detected by amplitude modulation detectors at the receivers, which alternating currents are applied to the grids and/or cathodes of the tubes 41, 41′ and 41″.

What is claimed is:

1. In an electrical wave energy relay, a first tube having a control electrode to which said wave energy is applied and having also an anode and a cathode, a second tube of the gaseous discharge type having an output electrode and two other electrodes comprising a control electrode and a cathode electrode, an output circuit coupled to said output electrode, translating means coupling the anode of said first tube to the cathode of said second tube to supply translated electrical wave energy from said first tube to said second tube, means for preventing the translated wave energy applied to the cathode of said second tube from firing the same, means for developing a positive direct potential about inversely proportional to the strength of said wave energy, said last-named means including a resistance, connected in series in the anode-cathode circuit of said first tube, across which said potential is developed, means connected between the control electrode and cathode of said second tube to apply a desired bias therebetween, and connections from said resistance to said two other electrodes of said second tube to apply said potential therebetween as a firing potential.

2. In an electrical wave energy relay, a first tube having a control electrode, an anode and a cathode, a second tube of the gaseous discharge type having an output electrode and two other electrodes comprising a control electrode and a cathode, an output circuit coupled to said output electrode, translating means coupling the anode of said first tube to the cathode of said second tube to supply translated electrical wave energy from said first tube to said second tube, means for preventing the translated wave energy applied to the cathode of said second tube from firing the same, a resistance connected in series in the anode-cathode circuit of the first tube, a resistance connected between the control electrode and cathode of said first tube, means for developing a direct potential which is about proportional to the strength of said wave energy, said last-named means including one of said resistances across which said potential is developed, means for establishing a bias between the control electrode and cathode of said second tube, and connections from said one of said resistances to said two other electrodes of said second tube to apply said potential therebetween as a firing potential.

WALTER LYONS.

REFERENCES CITED

The following references are of record in the file of this patent:

UNITED STATES PATENTS

| Number | Name | Date |
|---|---|---|
| 2,011,927 | Chireix | Aug. 20, 1935 |
| 2,055,309 | Ramsey | Sept. 22, 1936 |
| 2,076,335 | Dallenbach | Apr. 6, 1937 |